May 12, 1970 B. BARENYI 3,511,530
PASSENGER MOTOR VEHICLE WITH UPWARDLY
SWINGABLE PIVOTAL LATERAL DOORS
Filed April 10, 1967 2 Sheets-Sheet 2

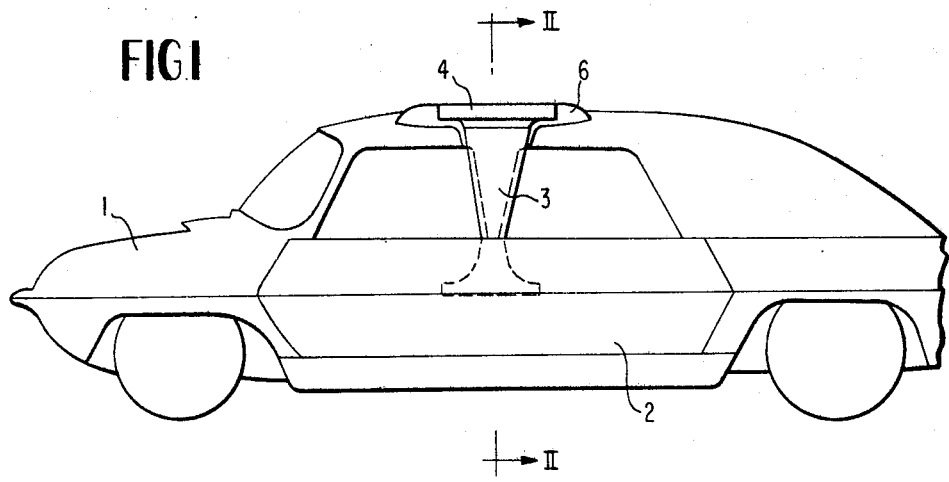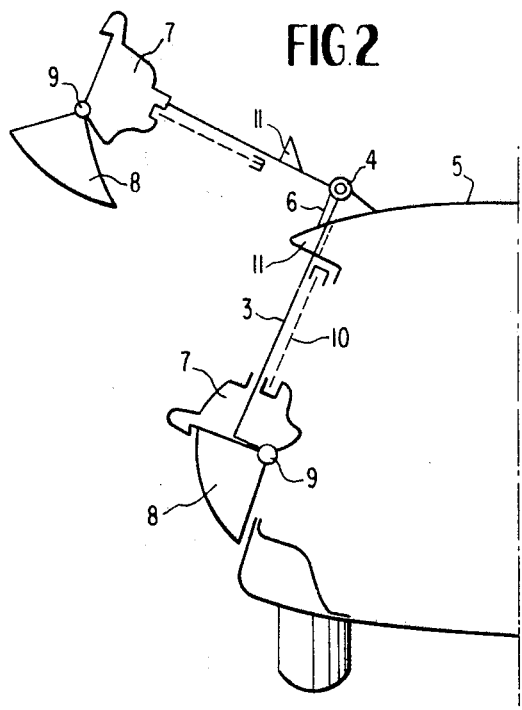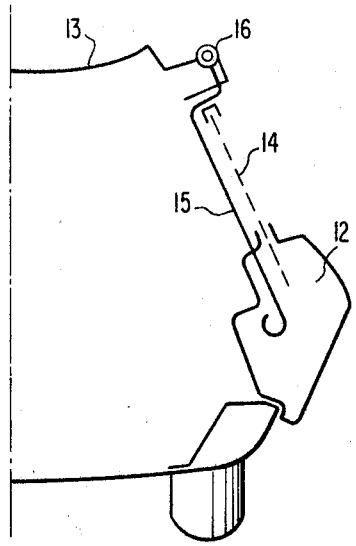

INVENTOR
BELA BARENYI

BY Dickel & Craig
ATTORNEYS

United States Patent Office 3,511,530
Patented May 12, 1970

3,511,530
PASSENGER MOTOR VEHICLE WITH UPWARDLY SWINGABLE PIVOTAL LATERAL DOORS
Bela Barenyi, Stuttgart-Vaihingen, Germany, assignor to Daimler-Benz Aktiengesellschaft, Stuttgart-Unterturkheim, Germany
Filed Apr. 10, 1967, Ser. No. 629,657
Claims priority, application Germany, Apr. 13, 1966, D 49,846
Int. Cl. B60j 5/04
U.S. Cl. 296—146            19 Claims

ABSTRACT OF THE DISCLOSURE

A motor vehicle, in particular a passenger motor vehicle, which comprises lateral doors pivotal in the vertical direction and supported in pivot joints disposed approximately at the lateral boundary of the vehicle roof, preferably considerably higher than the lateral windowpanes and above the roof plane; prestressed springs may be used in the pivot joints to at least partially eliminate the forces resulting from opening of the door, such springs being preferably torsion rods arranged coaxially to the pivot joints whereby the torsion rods on both sides of the vehicle may be connected by a cross strut. The door itself may be either unitary or may be formed of two parts movable relative to one another whereby in one construction the two parts may pivot relative to one another about a lonigtudinal axis or the two parts may be separate from each other with the upper part only pivotal in the upward direction while the lower part is subdivided into two doors pivotal about vertical axes arranged at the door columns.

BACKGROUND OF THE INVENTION

The present invention relates to a passenger motor vehicle with lateral doors which are swingable or pivotal in the upward direction.

Known in the prior art is a motor vehicle having two pivotal doors which are disposed opposite one another on the two sides of the vehicle and which are pivotal about a common axis arranged in the longitudinal center of the vehicle (U.S. Pat. 2,903,296). Additionally, a motor vehicle is known in the prior art in which the vehicle roof is provided with an upper girder, on the sides of which are arranged hinges pivotally supporting the vehicle doors (German Pat. 937,570). These known vehicles with pivotal or tiltable doors entail, above all, the disadvantage that a loading of the vehicle roof is rendered difficult or made impossible by the pivot pins of the doors.

SUMMARY OF THE INVENTION

The present invention aims at eliminating this disadvantage and at developing a motor vehicle with pivotal doors whose roof can be loaded and whose pivotal doors are kept particularly simple in their construction. The underlying problems are solved in accordance with the present invention with a vehicle of the aforementioned type in that the doors are pivotally supported approximately at the lateral vehicle roof boundary, preferably however, at pivot joints arranged considerably higher than the lateral windows and above the roof plane.

As a further feature of the present invention, the forces resulting during opening of the door can be eliminated at least partly by prestressed torsion springs arranged at the pivot joints.

In one preferred construction of the present invention, the forces resulting during opening of the door are eliminated by torsion rods preferably arranged coaxially to the pivot joints.

The mutually opposite torsion springs or torsion rods may be form-lockingly connected with each other in an advantageous manner at their rearward and/or forward ends by cross struts. Particularly favorable is a bow-shaped construction of these cross struts. The torsion springs or torsion rods and cross struts may also be made in one piece.

It is further favorable if the torsion springs or torsion rods are arranged within the area of roof ribs of any conventional construction and extending along the vehicle roof.

According to another embodiment with motor vehicles, especially those having a pagoda-shaped roof surface adapted to be loaded directly, the torsion rods may be provided with torque tubes and the forward and rearward ends of the torsion rods may be connected with each other in a bow-like manner. A luggage rack is produced thereby simultaneously with the door suspension.

The motor vehicle doors themselves may be each connected with the pivot joints by one or several webs. Particularly favorable is a construction in which the vehicle door occupies double the width of a normal door, thus replacing two conventional doors arranged one behind the other, and is provided with only a single vertical center web. If several webs are provided at a door, then it is favorable if these webs are arranged diverging.

The door webs may also serve as air guidance for the ventilation of the vehicle interior space and, for that purpose, may be constructed hollow and provided with suitable apertures. The anchoring of the door webs can take place at the upper halves of the lower door portion whereby the doors may be made of two halves pivotally connected with each other, one disposed above the other, and the lower halves may be pivoted or tilted downwardly during opening of the door about the connecting joints.

According to another appropriate construction, the doors may consist of an upper part pivotal in the upward direction and of a lower part subdivided vertically preferably in the center whose wings are pivotal toward the sides.

The doors and the hinge joints are preferably constructed symmetrically to their vertical center planes so that the oppositely disposed doors can be interchanged. A considerable saving in manufacture and stock requirements is achieved thereby.

Accordingly, it is an object of the present invention to provide a motor vehicle, especially a passenger motor vehicle which eliminates by extremely simple means the aforementioned shortcomings encountered with the prior art constructions.

Another object of the present invention resides in a passenger motor vehicle having lateral doors adapted to be pivoted in the upward direction whose roof can also be loaded, for example, with luggage and the like.

A further object of the present invention resides in a passenger motor vehicle having pivotal doors of the type described above which is extremely simple in construction and permits a simple spring arrangement reducing the forces resulting from the opening of the door.

Still another object of the present invention resides in a passenger motor vehicle with lateral, upwardly pivotal doors of the type described above, which results in considerable saving as regards manufacture and number of parts which must be stocked for purposes of repair.

These and further objects, features and advantages of the present invention will become more obvious from the following description when taken in connection with the accompanying drawing, which shows, for purposes of illustration only, several embodiments in accordance with the present invention, and wherein:

FIG. 1 is a somewhat schematic, side elevational view of a passenger motor vehicle having pivotal doors in accordance with the present invention;

FIG. 2 is a partial somewhat schematic, cross-sectional view, through the left half of the passenger motor vehicle of FIG. 1, taken along line II—II;

FIG. 3 is a partial somewhat schematic cross-sectional view through the right half of a modified embodiment of a passenger motor vehicle with a pivotal door according to the present invention;

Figure 4:
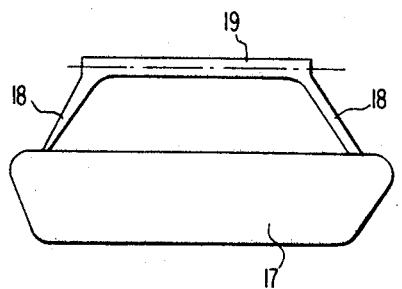
FIG. 4 is a side elevational view of a pivotal door having two securing webs in accordance with the present invention.

Referring now to the drawing wherein like reference numerals are used throughout the various views to designate like parts, the passenger motor vehicle 1 illustrated in FIG. 1 is provided on each side thereof with a swingable or pivotal door 2 of double the normal width which is intended as boarding door both for the front as well as the rear seats of the vehicle. This pivotal door 2 is supported only by a center web 3 and is pivoted in the upward direction during opening thereof about the hinge joint 4. The hinge joint 4 which may be of any conventional construction is preferably constituted by a torsion rod. The joint sleeve which is rigidly secured to or connected with the center web 3 and is mounted over the torsion rod, engages with the forward end of this torsion rod. The length of the torsion rod depends on the desired pivot range of the door.

As can be readily seen from FIG. 2, which represents the left side of a cross section through the motor vehicle according to FIG. 1, the right half being of mirror-image-like construction, the joints 4 are equipped with torsion rods extending in the longitudinal direction of the vehicle and are arranged above the roof plane approximately at the lateral vehicle roof boundary. The joints 4 are supported by special bearing mounts 6 mounted in any conventional manner on the roof 5, whereby appropriate reinforcing means may be provided in the roof within the area of the support mounts 6. In the illustrated embodiment according to FIG. 2, the door body is formed of two halves 7 and 8. With the door swung out, the lower half 8 thereof may be pivoted downwardly about the connecting joint 9 which is also of any conventional construction. The joint 9 may be arranged in a favorable manner at the lower end of the center web 3 of the door 2 to which it may be secured in any conventional manner. The sliding windows 10 of conventional construction are indicated in dash line. Appropriate guide means may be provided in the center web 3 to enable the sliding movements of the windows in mutually opposite directions. The laterally projecting roof edge 11 is cut out within the area of the center web 3 and is pivoted along with the door during pivotal opening movements thereof.

The web 3 constructed in a particularly wide manner serves simultaneously as reinforcement of the body and with sliding windows covers in a favorable manner the mutually opposite edges of the forward and rearward sliding windows 10.

After the unlocking of the door 2, the latter automatically pivots upwardly as a result of the effect of the torsion rod and the lower part 8 of the door 2 folds or swings downwardly whereby the lever arm by means of which the door engages at the torsion rod, is considerably reduced.

FIG. 3 illustrates the arrangement of a pivotal door 12 in a passenger motor vehicle having a concavely curved roof 13. In this embodiment the door 12 is unitary, i.e., in one piece. The windows 14 thereof are constructed in a conventional manner as crank-type windows and can be lowered into the door in the customary manner. It is advantageous and favorable if the door 12 is made from light-weight metal or synthetic plastic material of any suitable known type in order that during the upward pivoting of the door an excessively large torque about the pivot joint 16 does not occur. In this embodiment, the center web 15 is arranged behind the windowpane 14 on the inside of the motor vehicle. During opening, the door 12 pivots about the joint 16 which is constituted by a torsion rod with assembled joint sleeve. The joint 16 in this embodiment is inserted in a favorable manner into the outer roof edge where it may be secured again in any conventional manner.

FIG. 4 illustrates a unitary door construction in which the door 17 is supported by two lateral support webs 18. The support webs 18 are connected to the joint sleeve 19.

Figure 5:
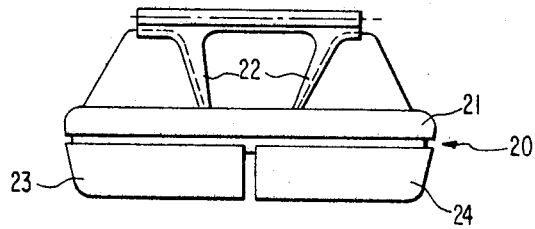
FIG. 5 is a side elevational view of a modified embodiment of a pivotal door according to the present invention and provided with two securing webs.

FIG. 5 illustrates a door generally designated by reference numeral 20 in which exclusively the upper part 21 is pivoted upwardly during the opening. The lower half of the door 20 is again subdivided into two further wings 23 and 24 which are connected by means of conventional hinges with the lateral door columns, not illustrated in detail, and which are pivoted laterally outwardly during opening of the door 20.

Figure 6:
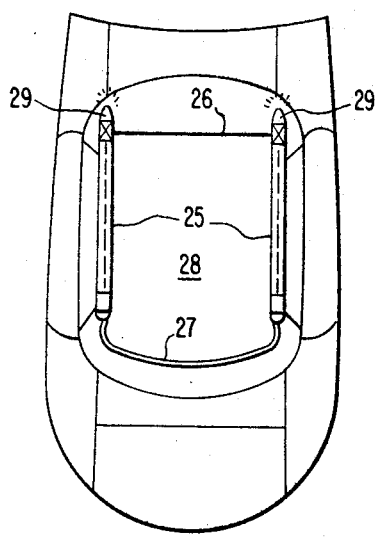
FIG. 6 is a top plan view on a motor vehicle with pivotal doors according to the present invention.

In the embodiment according to FIG. 6, the torsion rods 25 arranged within the area of the vehicle roof boundary are connected into a unit by a cross strut 26. This cross strut 26 contributes considerably to the absorption and equalization of torques of the torsion rods 25. Additionally, a boundary tube 27 may be arranged at the forward ends of the torsion rod 25 which serves as anchoring or support for the luggage pieces loaded onto the roof 28. Lights 29 or other motor vehicle auxiliary parts may be arranged at the torsion rods 25 in a simple manner.

Figure 7:
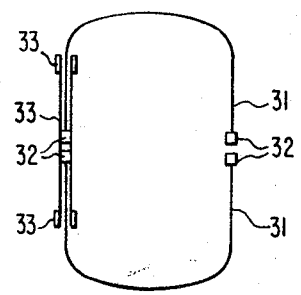
FIG. 7 is a schematic plan view on the arrangement of torsion rods with torque tubes used for the pivotal doors according to the present invention.

A particular construction of the torsion rods 31 provided with torque tubes 30 is illustrated in FIG. 7. The bow-shaped torsion rods 31 are arranged on the roof of the vehicle facing each other with their ends 32. The ends 32 of the torsion rods 31 which are provided with spline teeth are thereby inserted, as shown on the left side of FIG. 7, on both sides of the vehicle into a respective torque tube 30. A toothed arrangement provided in the center of the torque tube 30 receives the ends 32 of the torsion rods 31. The pivot door is then connected to the ends 33 of each torque tube 30 on each side of the vehicle.

As mentioned above, the center webs supporting the pivotal doors may also be so constructed as to constitute passages for the ventilation of the interior space of the motor vehicle.

While I have shown and described several embodiments in accordance with the present invention, it is understood that the same is not limited thereto but is susceptible of numerous changes and modifications as known to a person skilled in the art, and I therefore do not wish to be limited to those details shown and described herein only for illustrative purposes, but intend to cover all such modifications and changes as are encompassed by the scope of the appended claims.

I claim:

1. In a passenger motor vehicle body, including a roof and lateral doors having windows therein, said doors being supported for pivotal motion in a vertical plane between a relatively lower, closed position and a relatively higher, open position, the improvement comprising pivot joint means for pivotally supporting said doors at said roof, said pivot joint means being located at the lateral roof boundary, considerably above said windows in said lateral doors and substantially above the plane of said roof, wherein each of said doors includes upper and lower portions pivotally interconnected at a connecting joint, said lower portions being adapted to pivot about said connecting joints as said door is pivoted upwards about said pivot joint means, and web means secured at the upper part of each of said lower door portions, and wherein said doors and said pivot joint means are symmetric about a vertical center plane through said vehicle.

2. The improvement according to claim 1, further comprising prestressed torsion spring means arranged at the pivot joint means for at least partially eliminating the forces resulting during opening of a door.

3. The improvement according to claim 1, further comprising torsion rod means arranged at the pivot joint means for at least partially eliminating the forces resulting during the opening of the door.

4. The improvement according to claim 1, wherein said torsion rod means are arranged substantially coaxially to the pivot joint means.

5. The improvement according to claim 4, wherein said torsion rod means include two oppositely-disposed torsion rods interconnected by cross strut means.

6. The improvement according to claim 2 wherein said spring means include two oppositely-disposed torsion springs interconnected by cross strut means.

7. The improvement according to claim 6, wherein the cross strut means connects the forward ends of the spring means.

8. The improvement according to claim 6, wherein the cross strut means connects the rear ends of the spring means.

9. The improvement according to claim 6, wherein the cross strut means connect with each other the forward as well as rearward ends of the two spring means.

10. The improvement according to claim 5, wherein the cross strut means is constructed of bow-like shape.

11. The improvement according to claim 6, wherein the cross strut means is constructed of bow-like shape.

12. The improvement according to claim 5, wherein the torsion rod means and one of the cross strut means are constructed integrally.

13. The improvement according to claim 6, wherein the spring means and one of the cross strut means are constructed integrally.

14. The improvement according to claim 5, further including roof rib means extending along the vehicle roof and wherein the torsion rod means are arranged within the area of said roof rib means.

15. The improvement according to claim 5, further including roof rib means extending along the vehicle roof and wherein the spring means are arranged within the area of said roof rib means.

16. The improvement according to claim 5, wherein said roof is constructed concavely in the upward direction thereof and adapted to be loaded directly, and wherein said torsion rod means are provided with torque tube means, the forward and rearward ends of the torsion rod means being respectively interconnected in a bow-like manner.

17. The improvement according to claim 1, wherein said web means includes a substantially-vertical, center web.

18. The improvement according to claim 17, wherein said web means serve as air guide means for the ventilation of the vehicle interior space and are constructed hollow and provided with aperture means for that purpose.

19. In a passenger motor vehicle body, including a roof and lateral doors having windows therein, said doors being supported for pivotal motion in a vertical plane between a relatively lower, closed position and a relatively higher, open position, the improvement comprising pivot joint means for pivotally supporting said doors at said roof, said pivot joint means being located at the lateral roof boundary, considerably above said windows in said lateral doors and substantially above the plane of said roof, wherein each of said doors includes upper portions adapted to pivot upwardly about said pivot joint means and lower portions, vertically subdivided into wing portions, said wing portions each being adapted to pivot about substantially vertical axes.

References Cited

UNITED STATES PATENTS

| | | | |
|---|---|---|---|
| 3,247,892 | 4/1966 | Harmon | 160—207 |
| 3,239,269 | 3/1966 | Wilfert | 296—137 |

FOREIGN PATENTS

| | | |
|---|---|---|
| 927,758 | 6/1963 | Great Britain. |
| 939,858 | 3/1956 | Germany. |
| 937,570 | 1/1956 | Germany. |
| 845,647 | 8/1952 | Germany. |
| 1,109,549 | 6/1961 | Germany. |
| 1,101,183 | 3/1961 | Germany. |
| 900,305 | 12/1953 | Germany. |
| 645,561 | 11/1950 | Great Britain. |

PHILIP GOODMAN, Primary Examiner

U.S. Cl. X.R.

49—386